(No Model.)
G. C. VAN KEUREN.
VEHICLE AXLE AND AXLE NUT.
No. 335,858. Patented Feb. 9, 1886.
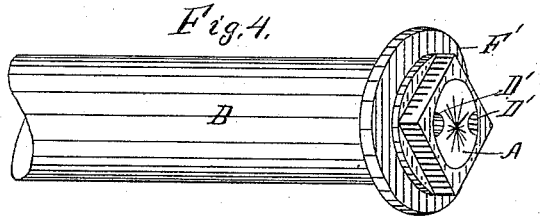
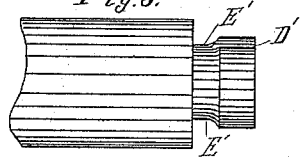 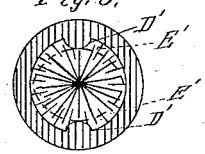
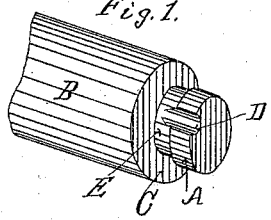 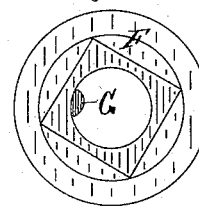 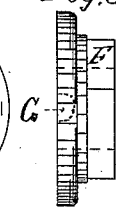
Attest.
L. D. Hanford
H. M. Sturgeon
Inventor.
George C. Van Keuren
Per _____
Atty.

UNITED STATES PATENT OFFICE.

GEORGE C. VAN KEUREN, OF DUQUOIN, ILLINOIS.

VEHICLE-AXLE AND AXLE-NUT.

SPECIFICATION forming part of Letters Patent No. 335,858, dated February 9, 1886.

Application filed October 8, 1885. Serial No. 179,366. (No model.)

*To all whom it may concern:*

Be it known that I, GEORGE C. VAN KEUREN, a citizen of the United States, residing at Duquoin, in the county of Perry and State of Illinois, have invented certain new and useful Improvements in Vehicle-Axles and Axle-Nuts; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to vehicle-axles and nuts therefor; and it consists in the improvements hereinafter set forth and explained.

My invention is illustrated in the accompanying drawings, in which Figure 1 is a perspective view of a section of my improved vehicle-axle with the nut removed therefrom. Fig. 2 is an end view of my improved axle-nut. Fig. 3 is a side view of my improved axle-nut. Fig. 4 is a perspective view of a section of a modified form of my improvement. Fig. 5 is a side view of same with nut removed. Fig. 6 is an end view of same.

Like letters refer to like parts in all the figures.

In constructing my improved vehicle-axle and nut therefor I turn off the end of the axle somewhat smaller than the spindle, forming a square shoulder, C, thereon. I then cut therein a longitudinal groove, D, extending back to the shoulder C. I then cut an eccentric groove or slot, E, around the end A next to the shoulder C, the deepest point in this eccentric groove or slot E being at its junction with the longitudinal groove D. I then construct a nut, F, Figs. 2 and 3, of the ordinary and usual shape on the outside thereof, and dress it out so as to fit the part A on the axle B, and at the same time forming a lug, G, therein to fit the longitudinal groove D and eccentric groove E, so that when the nut F is slipped on the part A and up to the shoulder C on the axle it can be turned either way until the lug G tightens in the eccentric groove or slot E, which fastens the nut by the friction therein, and is sufficient to prevent the nut being turned back without the application of considerable more force than is required to loosen an ordinary nut, and by being thus constructed any axle-spindle can be used as a right or left spindle without changing the construction, as the construction described answers equally well on a right or left spindle.

In Figs. 4, 5, and 6 I show a modified form of the construction of my improvement, the only change being that in this case I cut longitudinal grooves D' D' on each side of the part A of the axle, and eccentric grooves or slots E' E', communicating therewith, and in the nut F' make two lugs, G' G', which fit the longitudinal grooves D' D' and grooves or slots E' E', and operate therein in the same manner as the single lug G, hereinbefore described, both lugs in this case acting upon the eccentric grooves to lock the nut.

In constructing the eccentric groove E it may be of any form desired, either round or square, the eccentric feature being retained, and any number of eccentric grooves may be used, their number being limited only by the size and length of the part A of the axle.

Having thus fully described my invention so as to enable others conversant with the art to which it appertains to construct and use the same, what I claim as new, and desire to secure by Letters Patent of the United States, is—

1. The combination, with a vehicle-axle provided with an eccentric groove or grooves in the end thereof, of an axle-nut provided with a lug or lugs operating in such eccentric groove or grooves, substantially as and for the purpose set forth.

2. The combination of a vehicle-axle provided with both a longitudinal groove or grooves and with an eccentric groove or grooves in the end of the spindle thereof, of an axle-nut having a lug or lugs therein operating in said longitudinal and eccentric grooves, substantially as and for the purpose set forth.

3. The combination, with the vehicle-axle B, having the shoulder C and projection A, provided with the longitudinal groove D and eccentric groove E, of the nut F, provided with the lug G, substantially as and for the purpose set forth.

In testimony whereof I affix my signature in presence of two witnesses.

GEORGE C. VAN KEUREN.

Witnesses:
S. G. PARKS,
WM. GODDARD.